US012634245B2

(12) United States Patent
Fettes

(10) Patent No.: US 12,634,245 B2
(45) Date of Patent: May 19, 2026

(54) PACKET PROCESSOR RESOURCE ALLOCATION USING LINEAR PROGRAMMING

(71) Applicant: Arista Networks, Inc., Santa Clara, CA (US)

(72) Inventor: Adrian Donald Fettes, Vancouver (CA)

(73) Assignee: ARISTA NETWORKS, INC., Santa Clara, CA (US)

( * ) Notice: Subject to any disclaimer, the term of this patent is extended or adjusted under 35 U.S.C. 154(b) by 90 days.

(21) Appl. No.: 18/933,488

(22) Filed: Oct. 31, 2024

(65) Prior Publication Data

US 2026/0122002 A1 Apr. 30, 2026

(51) Int. Cl.
*H04L 47/80* (2022.01)
*G06F 17/16* (2006.01)

(52) U.S. Cl.
CPC ............ *H04L 47/801* (2013.01); *G06F 17/16* (2013.01); *H04L 47/805* (2013.01)

(58) Field of Classification Search
CPC ...... H04L 47/801; H04L 47/805; G06F 17/16
See application file for complete search history.

(56) References Cited

U.S. PATENT DOCUMENTS

| | | | | |
|---|---|---|---|---|
| 7,848,128 B2 * | 12/2010 | Arsovski | ................ | G11C 15/04 365/49.17 |
| 2014/0328103 A1 * | 11/2014 | Arsovski | ............. | G11C 11/5642 365/49.17 |
| 2023/0162024 A1 * | 5/2023 | Wang | ................... | G06F 7/5443 706/19 |

OTHER PUBLICATIONS

Scalable Ternary Content Addressable Memory Implementation Using FPGAs (Year: 2013).*
TSAM demystified (Year: 2020).*

* cited by examiner

*Primary Examiner* — Bryan Y Lee
(74) *Attorney, Agent, or Firm* — Fountainhead Law Group, PC

(57) ABSTRACT

Techniques for allocating packet processor resources in a network device using linear programming (LP) are provided. In certain embodiments, these techniques enable the construction of an LP problem formulation for determining, at the time of receiving a TCAM profile specifying j contexts and i TCAM features to be enabled with respect to the j contexts, whether a feasible assignment of the i TCAM features to the cycles of the network device's packet processor exists (and if so, what that assignment is).

20 Claims, 3 Drawing Sheets

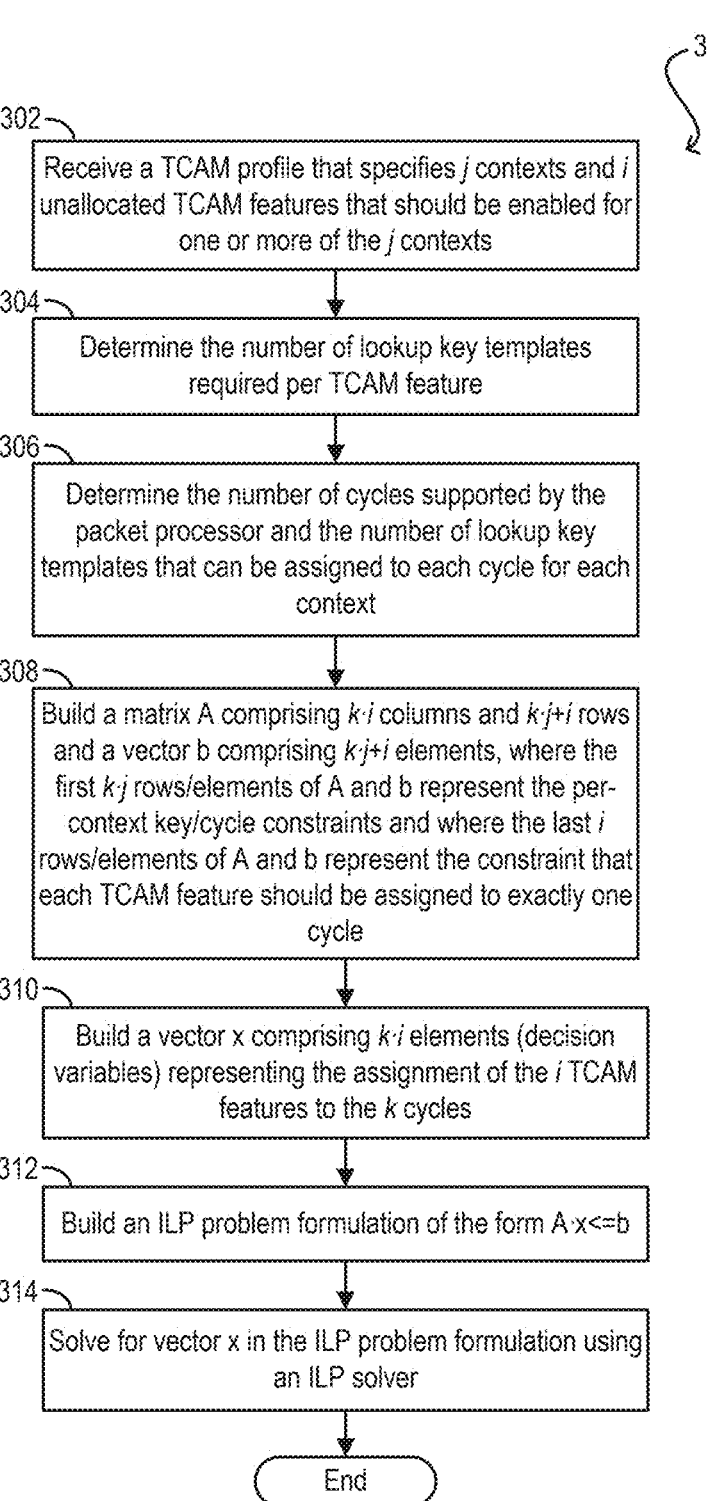

300

302
Receive a TCAM profile that specifies *j* contexts and *i* unallocated TCAM features that should be enabled for one or more of the *j* contexts 304
Determine the number of lookup key templates required per TCAM feature 306
Determine the number of cycles supported by the packet processor and the number of lookup key templates that can be assigned to each cycle for each context 308
Build a matrix A comprising $k \cdot i$ columns and $k \cdot j + i$ rows and a vector b comprising $k \cdot j + i$ elements, where the first $k \cdot j$ rows/elements of A and b represent the per-context key/cycle constraints and where the last *i* rows/elements of A and b represent the constraint that each TCAM feature should be assigned to exactly one cycle 310
Build a vector x comprising $k \cdot i$ elements (decision variables) representing the assignment of the *i* TCAM features to the *k* cycles 312
Build an ILP problem formulation of the form $A \cdot x <= b$ 314
Solve for vector x in the ILP problem formulation using an ILP solver End

*FIG. 3*

PACKET PROCESSOR RESOURCE ALLOCATION USING LINEAR PROGRAMMING

BACKGROUND

Ternary content-addressable memory (TCAM) is a type of physical memory that enables fast, parallel matching of its data contents against an input. In network devices like switches and routers, TCAM is populated with entries that correspond to TCAM features, where a TCAM feature is a combination of a set of lookup key templates (each one of which comprises packet header and/or metadata fields) and an action type. For example, a TCAM feature F may include the lookup key template [source Internet Protocol (IP) address, destination IP address] and the action type [forwarding]. In this example, the TCAM may be populated with TCAM entries corresponding to a set of rules defined for TCAM feature F, where each such rule specifies match criteria for the source IP address and/or destination IP address fields and a forwarding action to be taken on matched traffic.

When a network device receives a packet that belongs to a class of network traffic (referred to as a context) for which one or more TCAM features are enabled, the network device's packet processor applies the lookup key templates of those TCAM features to the packet, resulting in the generation of a lookup key instance for each applied template based on the packet's contents. The packet processor then performs a lookup of each generated lookup key instance in a partition (i.e., bank) of the TCAM, thereby finding matching TCAM entries. Due to resource limitations on the number of lookup key instances that can be generated in each processing stage of the packet processor, not all TCAM features can be used/enabled simultaneously on a single context.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 3 depicts a flowchart of linear programming-based resource allocation algorithm in accordance with certain embodiments of the present disclosure.

DETAILED DESCRIPTION

In the following description, for purposes of explanation, numerous examples and details are set forth in order to provide an understanding of embodiments of the present disclosure. Particular embodiments as expressed in the claims may include some or all of the features in these examples, alone or in combination with other features described below, and may further include modifications and equivalents of the features and concepts described herein.

Figure 1:
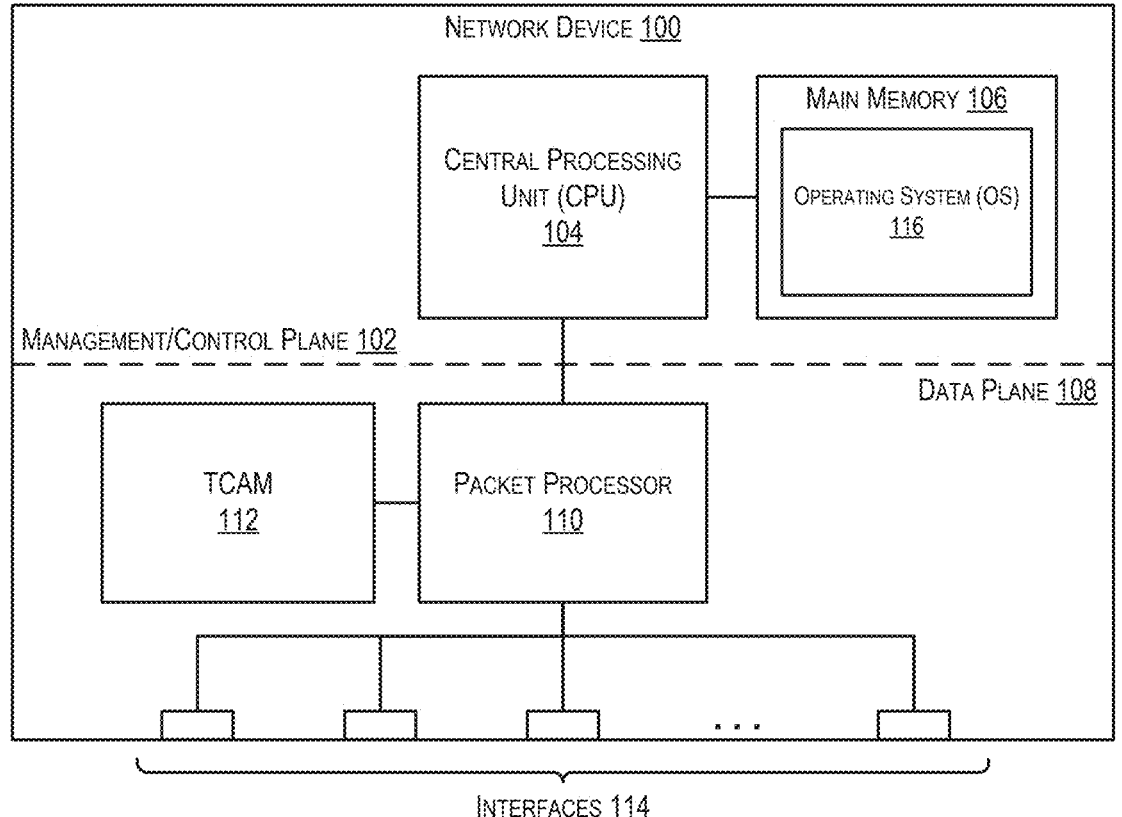
FIG. 1 depicts an example network device in accordance with certain embodiments of the present disclosure.

Embodiments of the present disclosure are directed to techniques for allocating packet processor resources in a network device using linear programming (LP). FIG. 1 is a simplified block diagram of a network device 100 (e.g., a switch, router, etc.) in which these techniques may be implemented. As shown, network device 100 includes a management/control plane 102 comprising a central processing unit (CPU) 104 and a main memory 106, as well as a data plane 108 comprising a packet processor 110, a TCAM 112, and a plurality of interfaces (i.e., ports) 114.

CPU 104 is a general-purpose processor that is responsible for managing the configuration/operation of network device 100 and controlling the device's understanding of the network in which it resides. CPU 104 carries out these functions under the direction of an operating system (OS) 116 that runs on CPU 104 from main memory 106.

Packet processor 110 is an integrated circuit, such as an application-specific integrated circuit (ASIC) or field-programmable gate array (FPGA), that is responsible for performing line-speed processing of network packets (i.e., traffic) that pass through network device 100 via interfaces 114. The line-speed processing performed by packet processor 110 includes, among other things, the execution of various TCAM features that are enabled on network device 100. As mentioned previously, a TCAM feature is a combination of a set of lookup key templates (each composed of packet header and/or metadata fields like source IP address, destination IP address, Multi-Protocol Label Switching (MPLS) labels, Time-to-Live (TTL), etc.) and an action type (e.g., forwarding, drop redirect, etc.). At a higher level of abstraction, a TCAM feature can be understood as a data plane functionality such as PBR, QoS, ACLs, mirroring, and so on.

Generally speaking, a TCAM feature is associated with a set of rules, where each rule includes one or more match criteria for the fields in one of the TCAM feature's lookup key template(s) and one or more actions corresponding to the TCAM feature's action type. In addition, a TCAM feature can be applied to, or in other words enabled for, one or more contexts, where a context refers to a class of network traffic and is identified by a packet type (e.g., IPv4, IPv6, etc.) and a forwarding decision applied to the traffic (e.g., routed, bridged, routed multicast, routed encapsulation/de-encapsulation, etc.). For example, ACLs may be enabled for bridged IPv4 traffic and routed IPv6 traffic, which means that the rules of this TCAM feature are applied to these two contexts. If a TCAM feature F is enabled on network device 100 for a context C, network device 100 retrieves (from a stored configuration file or from a device user via a user interface) a configuration for F that comprises F's rules and programs the rules into TCAM entries within one or more partitions (i.e., banks) of TCAM 112. Further, the lookup key template(s) for TCAM feature (and indications of which contexts each lookup key template applies to) are also programmed per-context via tables and registers on network device 100. Once this programming is done, packet processor 110 enforces the rules on an incoming or outgoing network packet of context C by (1) applying an appropriate lookup key template of TCAM feature F to the packet in accordance with the context to which the packet belongs, resulting in the generation of a lookup key instance based on the packet's contents (for example, if the lookup key template comprises the source IP and destination IP address fields, the generated lookup key instance will include the actual source IP and destination IP address values in the packet's header); (2) matching the lookup key instance against the match criteria specified in the TCAM entries, resulting in the identification of a matched TCAM entry; and (3) executing the corresponding action(s) specified in the matched TCAM entry on the packet.

Some existing network devices like network device 100 of FIG. 1 allow users to customize the usage of TCAM 112 by selectively enabling some or all TCAM features available on the device for some or all contexts. This configuration, which sets the TCAM lookup behavior for various classes of network traffic, is referred to herein as a TCAM profile. Enabling a TCAM feature for a context generally requires that the TCAM feature—or more precisely, the set of lookup key templates of the feature—be allocated (or in other words, assigned to) a hardware resource of packet processor 110, referred to herein as a cycle. This allocation allows packet processor 110 to execute the TCAM feature for that context in hardware. A cycle can be understood as a stage in packet processor 110's hardware pipeline and is associated with a certain capacity of lookup key templates that can be programmed/assigned to it.

Packet processors like packet processor 110 have various hardware limitations that constrain the total number of cycles available for allocation and the number of lookup key templates that can be assigned to each cycle for each context (hereinafter referred to as the cycle's lookup key template capacity). These hardware limitations also generally require that all lookup key templates of a TCAM feature be assigned to the same cycle (even across different contexts). Such limitations can make it difficult for network device 100 to determine a feasible assignment of TCAM features to cycles for a TCAM profile, particularly if the TCAM profile specifies a large number of TCAM features/contexts.

Figure 2:
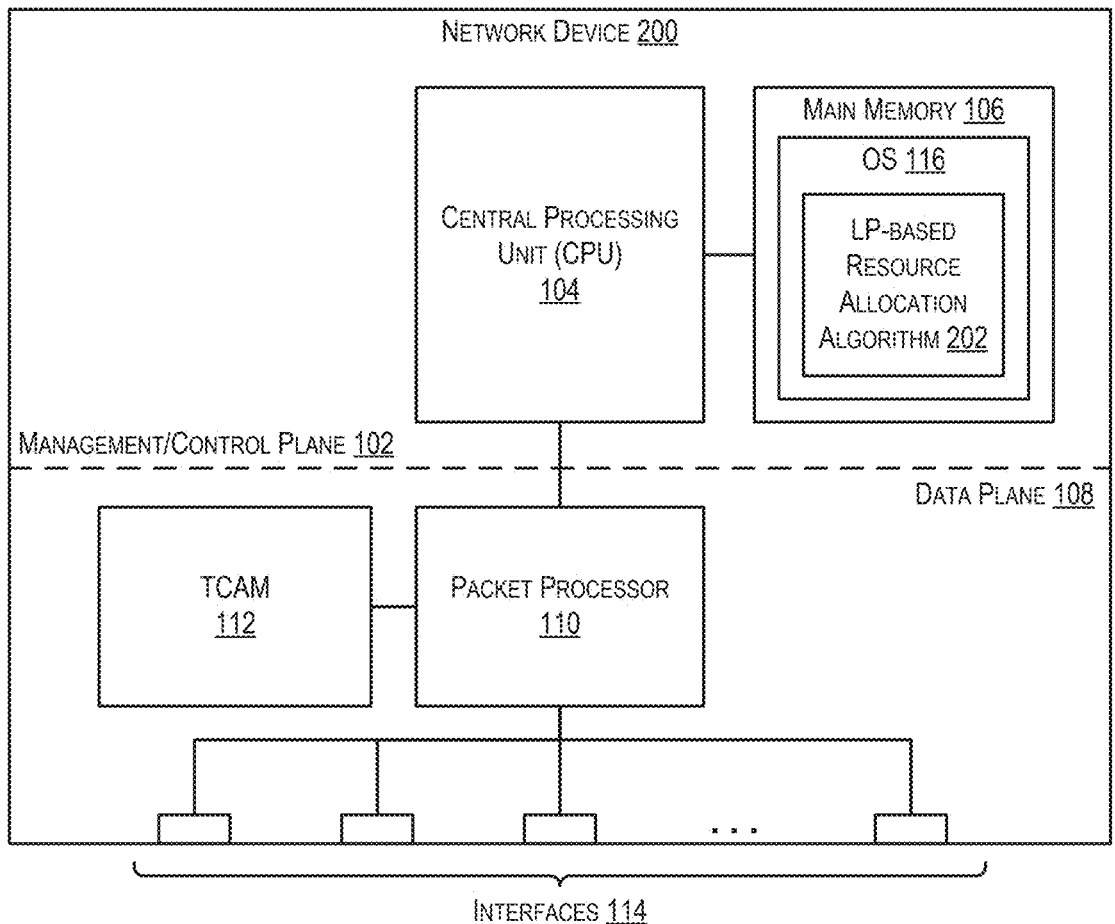
FIG. 2 depicts another example network device in accordance with certain embodiments of the present disclosure.

To address the foregoing and other similar problems, FIG. 2 depicts an enhanced version 200 of network device 100 of FIG. 1 that includes a novel LP-based resource allocation algorithm 202. Algorithm 202 may be implemented in software, hardware, or a combination thereof. In the example of FIG. 2, algorithm 202 is implemented in software (i.e., program code) that is part of OS 116 and is executable by a processor (e.g., CPU 104) of network device 200.

At a high level, LP-based resource allocation algorithm 202 enables network device 200 to determine, at the time of receiving a TCAM profile specifying j contexts and i TCAM features to be enabled with respect to the j contexts, whether a feasible assignment of the i TCAM features to the cycles of packet processor 110 exists (and if so, what that assignment is). As used herein, the phrase "assigning a feature to a cycle" refers to assigning all lookup key templates associated with (or in other words, required by) that feature to the cycle. In certain embodiments, algorithm 202 achieves this by building a LP problem formulation that (1) models the constraints imposed by the TCAM profile and the hardware limitations of packet processor 110, (2) models the assignment of TCAM features to cycles using a set of decision variables, and (3) and solves for the decision variables using an LP solver.

If the algorithm is able to find a solution to the LP problem formulation (i.e., a feasible/valid assignment of TCAM features to cycles), network device 200 can allocate the cycles of packet processor 110 accordingly. Alternatively, if the algorithm is unable to find a solution to the LP problem formulation, network device 200 can return an error to the user that configured the TCAM profile indicating that the profile cannot be installed. By allowing network device 200 to definitively determine whether a feasible assignment of TCAM features to cycles for a given TCAM profile exists, algorithm 202 can maximize the number of TCAM features that are enabled concurrently on the device (in accordance with the hardware limitations of packet processor 110) and thus can provide device users additional flexibility in configuring and using network device 200 as needed/desired.

FIG. 3 depicts a flowchart 300 illustrating the steps that may be performed by LP-based resource allocation algorithm 202 according to certain embodiments. Flowchart 300 specifically pertains to an implementation of algorithm 202 that employs integer linear programming (ILP) and thus uses variable values that are restricted to integers. In alternative embodiments, algorithm 202 may use non-integer variable values.

Starting with step 302, algorithm 202 can receive a TCAM profile that specifies j contexts and i unallocated TCAM features that should be enabled for one or more of the j contexts. If a particular TCAM feature should be enabled for a particular context, that context is said to "contain" that feature. In one set of embodiments, algorithm 202 can receive this TCAM profile at the time a user configures the profile on network device 200 and enters a command to install the profile.

At step 304, algorithm 202 can determine the number of lookup key templates that are required by each of the i TCAM features. As mentioned previously, a lookup key template is used to perform lookups into TCAM 112 and more specifically is used by a cycle to implement its corresponding TCAM feature. The number of lookup key templates required by each TCAM feature can be predefined or can be computed based upon, e.g., the number and type of match criteria defined for the TCAM feature in the TCAM profile.

At step 306, algorithm 202 can determine the number of cycles supported by (or in other words, available for allocation in) packet processor 110 and the lookup key template capacity for each cycle for each context. These constraints will generally be dictated by the design of packet processor 110. The total number of cycles available is denoted as k.

At step 308, algorithm 202 can build a matrix A comprising k·i columns and k·j+i rows and a vector b comprising k·j+i elements, where the first k·j rows/elements of A and b represent the per-context key/cycle constraints noted with respect to step 306, and where the last i rows/elements of A and b represent the constraint that each of the i TCAM features should be assigned to exactly one cycle. In addition, algorithm 202 can build a vector x comprising k·i elements corresponding to the unknown decision variables that represent the assignment of the i TCAM features to the k cycles (step 310). For example, in certain embodiments the assignment of each TCAM feature Fi can be represented by k decision variables $$x_i^0, \ldots, x_i^{k-1}$$

(resulting k·i total decision variables). If $$x_i^0 = 1,$$

that means feature Fi is assigned to cycle 0, if $$x_i^1 = 1,$$

that means feature Fi is assigned to cycle 1, and so on.

Finally, at steps 312 and 314, algorithm 202 can build an ILP problem formulation of the form A·x≤b and can solve for vector x using a known ILP solver. As mentioned previously, if algorithm 202 can find a valid set of values for x, network device 200 can allocate the cycles of packet processor 202 to the i TCAM features accordingly. On the other hand, if algorithm 202 cannot find a valid set of values for x, network device 200 can return an error indicating the TCAM profile cannot be installed.

To help clarify how algorithm 202 as presented in FIG. 3 works, consider an example scenario where the TCAM profile received at step 302 specifies three contexts Ctx0, Ctx1, and Ctx2 and four TCAM features F0, F1, F2, and F3. The TCAM profile indicates that Ctx0 contains F0, F2, and F3, Ctx1 contains F1, F2, and F3, and Ctx2 contains F0 and F1. Assume that feature F0 requires one lookup key template, feature F1 requires two lookup key templates, feature F2 requires two lookup key templates, and feature F3 requires one lookup key templates. Further assume that packet processor 110 has two cycles Cyc0 and Cyc1 available for allocation and that to the lookup key template capacity for each cycle Cyc0/1 for each context Ctx0/1/2 is four.

In this example, matrix A, vector x, and vector b will be populated as shown below. Note that each element (decision variable)

$$x_i^k$$

of vector x represents the assignment (or non-assignment) of TCAM feature Fi to cycle Cyck. For example, if element $$x_0^1$$

of vector x is 1, that indicates an assignment of TCAM feature F0 to cycle Cyc1.

TABLE 1

| | $x_0^0$ | $x_0^1$ | $x_1^0$ | $x_1^1$ | $x_2^0$ | $x_2^1$ | $x_3^0$ | $x_3^1$ |
|---|---|---|---|---|---|---|---|---|
| | | | | Matrix A | | | | |
| $Ctx_0^0$ | 1 | 0 | 0 | 0 | 2 | 0 | 1 | 0 |
| $Ctx_0^1$ | 0 | 1 | 0 | 0 | 0 | 2 | 0 | 1 |
| $Ctx_1^0$ | 0 | 0 | 2 | 0 | 2 | 0 | 1 | 0 |
| $Ctx_1^1$ | 0 | 0 | 0 | 2 | 0 | 2 | 0 | 1 |
| $Ctx_2^0$ | 1 | 0 | 2 | 0 | 0 | 0 | 0 | 0 |
| $Ctx_2^1$ | 0 | 1 | 0 | 2 | 0 | 0 | 0 | 0 |
| $F_0$ | 1 | 1 | 0 | 0 | 0 | 0 | 0 | 0 |
| $F_1$ | 0 | 0 | 1 | 1 | 0 | 0 | 0 | 0 |
| $F_2$ | 0 | 0 | 0 | 0 | 1 | 1 | 0 | 0 |
| $F_3$ | 0 | 0 | 0 | 0 | 0 | 0 | 1 | 1 |

TABLE 2

| Vector x |
|---|
| $x_0^0$ |
| $x_0^1$ |
| $x_1^0$ |
| $x_1^1$ |
| $x_2^0$ |
| $x_2^1$ |
| $x_3^0$ |
| $x_3^1$ |

TABLE 3

| Vector b |
|---|
| 4 |
| 4 |
| 4 |
| 4 |
| 4 |
| 4 |
| 1 |
| 1 |
| 1 |
| 1 |

In the example above, the ILP problem formulation of form A·x≤b comprises the following list of constraints:

$$1.\ x_0^0 + 2(x_2^0) + x_3^0 \le 4 -$$

This constraint states that the assignment of lookup key templates for features F0, F2, and F3 (which are the features to be enabled for context Ctx0) to cycle Cyc0 for context Ctx0 must be less than or equal to 4 (because 4 is the lookup key template capacity per cycle per context). The decision variable $$x_2^0$$

is multiplied by 2 because TCAM feature F2 requires 2 lookup key templates.

$$2.\ x_0^1 + 2(x_2^1) + x_3^1 \le 4 -$$

This constraint states that the assignment of lookup key templates for features F0, F2, and F3 (which are the features to be enabled for context Ctx0) to cycle Cyc1 for context Ctx0 must be less than or equal to 4

(because 4 is the lookup key template capacity per cycle per context). The decision variable $$x_2^1$$

is multiplied by 2 because TCAM feature F2 requires 2 lookup key templates.

3.

$$2(x_1^0) + 2(x_2^0) + x_3^0 \le 4 -$$

This constraint states that the assignment of lookup key templates for features F1, F2, and F3 (which are the features to be enabled for context Ctx1) to cycle Cyc0 for context Ctx1 must be less than or equal to 4 (because 4 is the lookup key template capacity per cycle per context). The decision variable $$x_1^0 \text{ and } x_2^0$$

are multiplied by 2 because TCAM features F1 and F2 each requires 2 lookup key templates.

4.

$$2(x_1^1) + 2(x_2^1) + x_3^1 \le 4 -$$

This constraint states that the assignment of lookup key templates for features F1, F2, and F3 (which are the features to be enabled for context Ctx1) to cycle Cyc1 for context Ctx1 must be less than or equal to 4 (because 4 is the lookup key template capacity per cycle per context). The decision variables $$x_1^1 \text{ and } x_2^1$$

are multiplied by 2 because TCAM features F1 and F2 each requires 2 lookup key templates.

5.

$$x_0^0 + 2(x_1^0) \le 4 -$$

This constraint states that the assignment of lookup key templates for features F0 and F1 (which are the features to be enabled for context Ctx2) to cycle Cyc0 for context Ctx2 must be less than or equal to 4 (because 4 is the lookup key template capacity per cycle per context). The decision variable $$x_1^0$$

is multiplied by 2 because TCAM feature F1 requires 2 lookup key templates.

6.

$$x_0^1 + 2(x_1^1) \le 4 -$$

This constraint states that the assignment of lookup key templates for features F0 and F1 (which are the features to be enabled for context Ctx2) to cycle Cyc1 for context Ctx2 must be less than or equal to 4 (because 4 is the lookup key template capacity per cycle per context). The decision variable $$x_1^1$$

is multiplied by 2 because TCAM feature F1 requires 2 lookup key templates.

7.

$$x_0^0 + x_0^1 = 1 -$$

This constraint states that the sum of the per-cycle decision variables for TCAM feature F0 must equal 1, which means F0 must be assigned to exactly one cycle (either Cyc0 or Cyc1).

8.

$$x_1^0 + x_1^1 = 1 -$$

This constraint states that the sum of the per-cycle decision variables for TCAM feature F1 must equal 1, which means F1 must be assigned to exactly one cycle (either Cyc0 or Cyc1).

9.

$$x_2^0 + x_2^1 = 1 -$$

This constraint states that the sum of the per-cycle decision variables for TCAM feature F2 must equal 1, which means F2 must be assigned to exactly one cycle (either Cyc0 or Cyc1).

10.

$$x_3^0 + x_3^1 = 1 -$$

This constraint states that the sum of the per-cycle decision variables for TCAM feature F3 must equal 1, which means F3 must be assigned to exactly one cycle (either Cyc0 or Cyc1).

It should be appreciated that the foregoing description of algorithm 202 is illustrative and various modifications are possible. For example, if algorithm 202 cannot find a feasible solution for vector x, in some embodiments the algorithm may identify and suggest one or more alternative TCAM profiles that are similar to the original TCAM profile and that result in a feasible solution.

As another example, in some embodiments the ILP problem formulation built at step 312 of flowchart 300 can be enhanced to include an objective function that is based on the decision variables in vector x. In these embodiments, the ILP solver can attempt to find a solution for vector x that both satisfies $A \cdot x \leq b$ and maximizes or minimizes the objective function. This may be useful if there are several feasible solutions and the goal is to identify a particular solution that meets certain objectives (e.g., maximizes the number of lookup key templates assigned to a particular cycle, etc.).

As yet another example, in certain cases a context may contain a TCAM feature Fi that must be assigned to a specific cycle Cyck for a specific context Ctxj. In these cases, algorithm 202 can adjust the ILP problem formulation so that the lookup key template capacity for cycle Cyck for context Ctxj is reduced by the number of lookup key templates of feature Fi (and refrain from including Fi in the formulation), under the assumption that Fi will in fact be assigned to Cyck for Ctxj.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular workflows and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments may have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations, and equivalents will be evident to those skilled in the art and may be employed without departing from the spirit and scope of the present disclosure as set forth in the following claims.

The invention claimed is:

1. A method performed by a network device for allocating cycles in a packet processor of the network device, the packet processor supporting k cycles, the method comprising:

receiving a ternary content-addressable memory (TCAM) profile that specifies j contexts and i TCAM features, each context containing one or more of the i TCAM features, each TCAM feature being associated with one or more lookup key templates;

building, based on the TCAM profile, a matrix A with $k \cdot i$ columns and $k \cdot j + i$ rows and a vector b with $k \cdot j + i$ elements, wherein the first $k \cdot j$ rows of matrix A and the first $k \cdot j$ elements of vector b represent constraints pertaining to a number of lookup key templates of each of the i TCAM features that are assignable to each of the k cycles for each of the j contexts, and wherein the last i rows of matrix A and the last i elements of vector b represent constraints indicating that the one or more lookup key templates of each of the i TCAM features must be allocated to exactly one of the k cycles;

building a vector x with $k \cdot i$ elements representing decision variables for assigning the i TCAM features to the k cycles;

building a linear programming (LP) problem formulation of the form $A \cdot x \leq b$; and using an LP solver to find a solution for vector x in the LP problem formulation.

2. The method of claim 1 further comprising:

upon finding the solution for vector x, assigning the i TCAM features to the k cycles in accordance with the solution.

3. The method of claim 1 further comprising:

upon failing to find any solution for vector x, generating an error message indicating that the TCAM profile cannot be installed on the network device.

4. The method of claim 1 wherein each of the j contexts corresponds to a class of network traffic and is identified by a packet type and a forwarding decision.

5. The method of claim 1 wherein each of the k cycles corresponds to a hardware stage in a processing pipeline of the packet processor.

6. The method of claim 1 wherein the i TCAM features include Quality of Service (QoS), policy-based routing (PBR), and access control lists (ACLs).

7. The method of claim 1 wherein the method is executed by software running on a central processing unit (CPU) of the network device, in response to the TCAM profile being configured and installed on the network device by a user.

8. The method of claim 1 further comprising:

upon failing to find any solution for vector x, identifying an alternative TCAM profile for which a solution is feasible.

9. The method of claim 1 wherein the solution for vector x maximizes or minimizes an objective function.

10. The method of claim 1 wherein the LP problem formulation is an integer linear programming (ILP) problem formulation and wherein the LP solver is an ILP solver.

11. A network device comprising:

a central processing unit (CPU);

a ternary content-addressable memory (TCAM);

a packet processor supporting k cycles; and a main memory having stored thereon program code that, when executed by the CPU, causes the CPU to:

receive a ternary content-addressable memory (TCAM) profile that specifies j contexts and i TCAM features, each context containing one or more of the i TCAM features, each TCAM feature being associated with one or more lookup key templates;

build, based on the TCAM profile, a matrix A with $k \cdot i$ columns and $k \cdot j + i$ rows and a vector b with $k \cdot j + i$ elements, wherein the first $k \cdot j$ rows of matrix A and the first $k \cdot j$ elements of vector b represent constraints pertaining to a number of lookup key templates of each of the i TCAM features that are assignable to each of the k cycles for each of the j contexts, and wherein the last i rows of matrix A and the last i elements of vector b represent constraints indicating that the one or more lookup key templates of each of the i TCAM features must be allocated to exactly one of the k cycles;

build a vector x with $k \cdot i$ elements representing decision variables for assigning the i TCAM features to the k cycles;

build a linear programming (LP) problem formulation of the form $A \cdot x \leq b$; and use an LP solver to find a solution for vector x in the LP problem formulation.

12. The network device of claim 11 wherein the program code further causes the CPU to:

upon finding the solution for vector x, assign the i TCAM features to the k cycles in accordance with the solution.

13. The network device of claim 11 wherein the program code further causes the CPU to:

upon failing to find any solution for vector x, generate an error message indicating that the TCAM profile cannot be installed on the network device.

14. The network device of claim 11 wherein each of the j contexts corresponds to a class of network traffic and is identified by a packet type and a forwarding decision.

15. The network device of claim 11 wherein each of the k cycles corresponds to a hardware stage in a processing pipeline of the packet processor.

16. The network device of claim 11 wherein the i TCAM features include Quality of Service (QoS), policy-based routing (PBR), and access control lists (ACLs).

17. The network device of claim 11 wherein the program code is executed by the CPU in response to the TCAM profile being configured and installed on the network device by a user.

18. The network device of claim 11 wherein the program code further causes the CPU to:

upon failing to find any solution for vector x, identify an alternative TCAM profile for which a solution is feasible.

19. The network device of claim 11 wherein the solution for vector x maximizes or minimizes an objective function.

20. A non-transitory computer readable storage medium having stored thereon program code for allocating resources in a packet processor that supports k cycles, the program code comprising instructions that, when executed by one or more processors, cause the one or more processors to:

receive a ternary content-addressable memory (TCAM) profile that specifies j contexts and i TCAM features, each context containing one or more of the i TCAM features, each TCAM feature being associated with one or more lookup key templates;

build, based on the TCAM profile, a matrix A with $k \cdot i$ columns and $k \cdot j + i$ rows and a vector b with $k \cdot j + i$ elements, wherein the first $k \cdot j$ rows of matrix A and the first $k \cdot j$ elements of vector b represent constraints pertaining to a number of lookup key templates of each of the i TCAM features that are assignable to each of the k cycles for each of the j contexts, and wherein the last i rows of matrix A and the last i elements of vector b represent constraints indicating that the one or more lookup key templates of each of the i TCAM features must be allocated to exactly one of the k cycles;

build a vector x with $k \cdot i$ elements representing decision variables for assigning the i TCAM features to the k cycles;

build a linear programming (LP) problem formulation of the form $A \cdot x \leq b$; and use an LP solver to find a solution for vector x in the LP problem formulation.

* * * * *